April 25, 1939.   B. D. THOMAS   2,156,168
METHOD FOR CONCENTRATING MATERIALS
Filed March 2, 1937
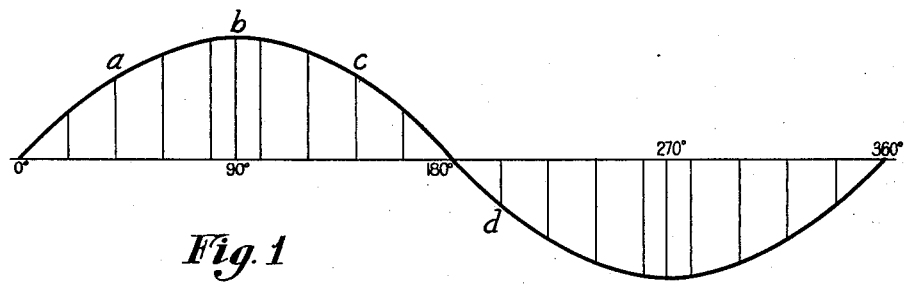
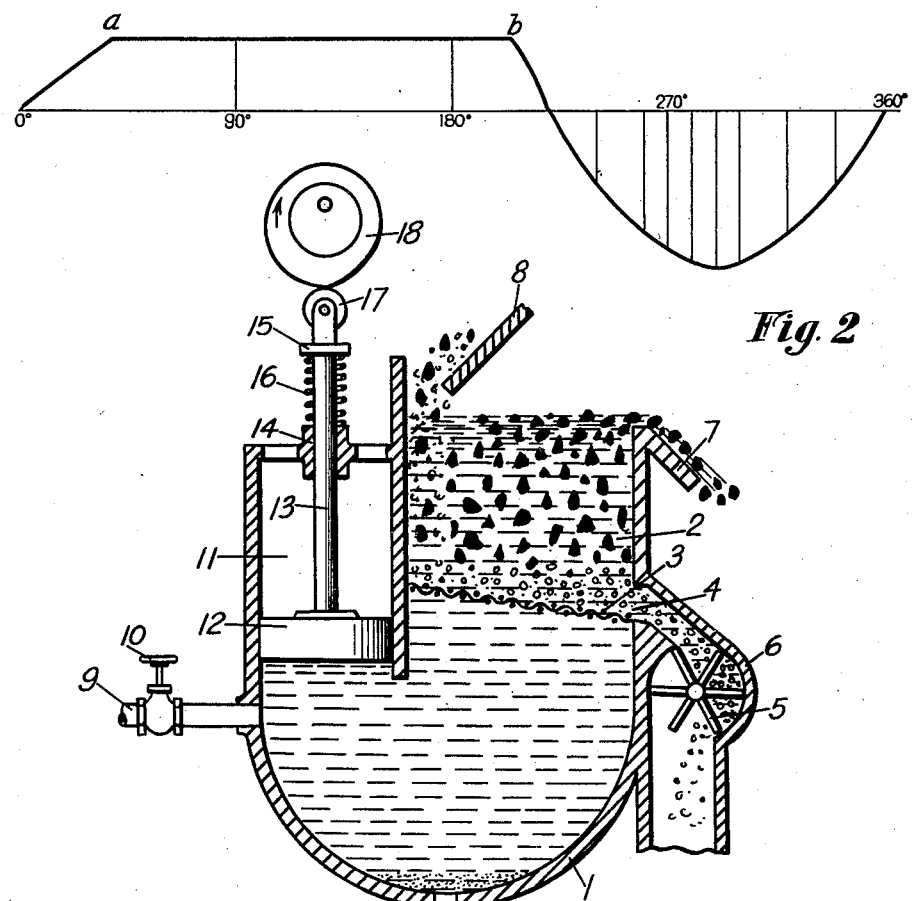
INVENTOR.
Bertram D. Thomas.
BY
ATTORNEYS.

Patented Apr. 25, 1939

2,156,168

UNITED STATES PATENT OFFICE 2,156,168

METHOD FOR CONCENTRATING MATERIALS

Bertram D. Thomas, Columbus, Ohio, assignor to Battelle Memorial Institute, Columbus, Ohio, a corporation of Ohio Application March 2, 1937, Serial No. 128,637

1 Claim. (Cl. 209—455)

My invention relates to method for concentrating materials. It has to do particularly with the provision of a novel method for operating jigs for the separation of coal, ore and similar materials together with an apparatus designed to facilitate the utilization of such novel method.

It has long been recognized that materials can be separated according to their specific gravities and sizes by submitting them to the action of a liquid flowing upwardly through the interstices between the particles of the materials. It has likewise been recognized that the separation attainable extends to a greater range of particle sizes, if the liquid moves with a reciprocating motion. This reciprocating motion is generally referred to as jigging and it has been utilized more or less efficiently in most, if not all, of the many types of jigs which have been devised.

Ordinarily, in the modern jig, the material to be separated or concentrated is supported as a bed on a screen plate supported within a chamber. Liquid is delivered continuously into the chamber below the plate and moves upwardly therethrough, being permitted to overflow or be delivered at a point or points above the bed of material through which it has passed. Usually, a means is provided for creating two phases, namely, a pulsion phase during which the water or other liquid is forced upwardly through the screen plate and bed, and a suction phase during which the water or other liquid is drawn downwardly through the bed. These two phases, together, form the jigging cycle. The force and time of application of the pulsion stroke are so related to the force and time of application of the suction stroke that these phases are of equivalent value as will be explained, although the continuously inflowing water or other liquid results in a continuous upward increment in the movement of such water or other liquid.

The reciprocating motion of the water with relation to the bed of materials is induced in various ways. Generally, this reciprocatory action is effected by a piston working in a cylinder connected with the chamber and exerting direct pressure upon the water; or compressed air is alternately admitted into a chamber connected to a chamber containing the screen plate and bed of materials and exhausted therefrom to effect alternate upward and downward movement of the liquid through the screen plate and bed of materials. In some cases, the relative reciprocation between the water and bed of materials is effected by disposing such bed of materials in a basket with a screenlike bottom and then moving the basket upwardly and downwardly to bring about alternate upward and downward movement of the water or other liquid through the bed of materials.

As indicated above, the reciprocating motion of the liquid in these prior art jigs is superimposed on a steady upward velocity, which is caused by the liquid input. By adjusting this liquid input, jig operators have been able to control the relationship of the pulsion and suction phases but this control practically exhausts the possibility of the prior art, as far as adjustment of the pulsion and suction phases is concerned.

One of the objects of my invention is to increase the capacity of a jig so that a greater tonnage may be handled in a given time.

Another object is to improve the separation so that better quality products are obtained.

Another object is to increase the size range of particles which may be separated in a given operation.

Another object is to improve the operation of the jig so that separations may be effected between particles of much nearer the same specific gravity than has hitherto been possible.

The accompanying drawing illustrates the difference between the prior art practice and my method and also illustrates one apparatus which I may utilize for performing my method.

In the drawing, similar characters of reference designate corresponding parts and, in such drawing:

Figure 1 is a graphical representation of a typical prior art jigging cycle.

Figure 2 is a graphical representation of one type of jigging cycle obtainable by my method.

Figure 3 is a sectional view of the principal features of one form of apparatus which I may utilize to perform my method.

Referring particularly to Figure 1 of the drawing, it will be seen that I have illustrated the velocity of the water in the jig chamber relative to the screen plate by plotting it against time to give a graphical representation of the jigging cycle. This is typical of these prior art jigs, whether the motion of the liquid relative to the bed of material is brought about by pressure applied through the medium of a plunger directly to the liquid, whether it is applied by means of compressed air or whether the relative motion between the liquid in the bed of material is obtained by the reciprocation within the liquid of a basket containing the bed of material. The velocity is represented in arbitrary units and the time in degrees of the cycle. It will be seen from Figure 1 that the resultant curve is a sine curve and represents the velocity of the liquid in the pulsion phase substantially as it occurs in these prior art jigs.

Referring to this Figure 1, the action of the bed of materials in responding to the motion of the liquid in the jig compartment, in accordance with prior art practice, may be described as follows. At the beginning of the pulsion phase, the water filters through the interstices of the bed without producing any motion of the particles. Eventually, however, a velocity is reached, say at the point $a$, where the particles are lifted from the screen plate and, if the jig is operating properly, the bed opens and the separation process begins. The velocity, however, continues to increase beyond the point $a$ to the peak of the pulsion phase $b$ and then it diminishes to a point $c$ where the bed begins to close, the closure being completed at some later point $d$, lying probably in the suction phase.

The true measure of the extent of the pulsion phase is determined by the total volume of water flowing through the screen plate during this pulsion phase of the cycle. This is an important factor in the operation of the jig and must be maintained if the jig is to produce a satisfactory separation.

One drawback about this method of operation is that it practically overlooks the important advantages which may be obtained if a true condition of "hindered settling" of the particles can be attained and maintained, particularly during the pulsion stroke. The term "hindered settling", which is well understood in the art of ore dressing and which is well described in the literature relating thereto, denotes a condition in a suspension of a bed of particles in liquid wherein such particles mutually interfere with each other in their settling actions. If this condition of "hindered settling" can be obtained and maintained, at a maximum consistent with separation particularly during the pulsion phase, the denser particles will not only settle into the lower portion of the bed but they will prevent the particles of less density from settling to the same extent. If this desired maximum condition of "hindered settling" is obtained and maintained or closely approximated, particularly during the pulsion phase, the result will be to greatly extend the range of size of the particles separated in the operation and to decrease the difference in the densities of the particles which may be separated. In other words, both particles of smaller size and particles of larger size can be separated in any given operation than can be obtained if this condition of "hindered settling" is not approximated and moreover the separation with respect to densities will be more sharp.

Consideration of the curve of Figure 1 will show that the prior art methods prevent the maintenance of this desired maximum condition of "hindered settling" during the separation process. Thus, the effect of the continued increase in velocity beyond the point $a$ in the curve of Figure 1 is to expand the bed further and to reduce and, in many cases, eliminate the conditions of "hindered settling".

My invention, in its preferred form, consists in a method and apparatus for concentrating materials wherein the fluid velocities at every part of the pulsion phase of the jig cycle are regulated and controlled in such a way that, upon attainment of a velocity sufficient to open the bed but not sufficient to open it to such an extent that the said desired hindered settling conditions are materially destroyed, this condition is maintained substantially throughout the pulsion phase of the cycle. In other words, the bed is opened by the relative upward movement of the liquid but the velocity of this liquid does not materially increase or become sufficient to open the bed to such an extent as to materially depart from the said maximum hindered settling condition. At the same time, my method contemplates prolonging the pulsion period sufficiently to insure the passing of the requisite quantity of the liquid through the screen plate and bed during this part of the cycle.

As a result of this novel method of operation and the apparatus provided therefor, I maintain a jigging cycle of which the time-velocity curve will be similar to that shown in Figure 2. In this figure it will be apparent that while the velocity is nowhere greater than the velocity $a$ of Figure 1, still the volume of water going through the screen plate during the pulsion phase, which is represented by the area between the pulsion curve and the axis, is the same as before.

In a plunger or diaphragm jig I accomplish this result by driving the plunger or diaphragm by a suitable cam designed from the curve required. It will be clearly understood, of course, that the curve of Figure 2 is a time-velocity curve and that the cam, which represents a displacement, may be derived from this curve by an integration process.

The velocity $a$ is readily found by experiment, since it is merely necessary to place the material in a classifier column and determine the velocity necessary to open the bed of particles and give it a mobility easily recognized by a jig operator as suitable for the separation. Since this velocity will be different for different classes of material it is impossible to state in general what it will be. However, as an example, for ¾ inch coal I have found a water velocity of 4 inches per second to be suitable as the maximum velocity with the pulsion phase prolonged to 240 degrees of the cycle rather than the usual 180-185 degrees.

It will be seen that I have provided a novel method of operating a jig in that I regulate the velocity of the liquid, particularly in the pulsion phase, to produce a marked departure from the usual progressive increase or decrease and at the same time regulate the time period of this pulsion phase to compensate for the said variation of velocity, these regulations being effected either with or without alteration of the liquid input of the jig. More specifically, I have devised a novel method of jigging wherein the velocity of the liquid passing upwardly through the screen and bed increases substantially continuously and progressively to that extent necessary to open the bed and produce a maximum condition of hindered settling consistent with effective separation and thereafter I maintain this velocity substantially constant while prolonging the time period of the pulsion phase to insure the passage of the usual volume of liquid during such pulsion phase to compensate for the departure from the usual practice of progressively increasing the velocity of the liquid. Thus, the proper volume of liquid is utilized during the pulsion phase while, at the same time, the harmful effects of increasing the velocity beyond the most desirable point are eliminated.

As a result of the changes made in the water velocities the conditions for effecting a separation in the bed of material are greatly improved. This is particularly true from the standpoint of the time. By using my improved method the fraction of the cycle during which conditions are favorable for good separation is much longer than in the method of the prior art. As a result of this fact I find that the capacity of the jig is greatly increased.

Since I maintain conditions of hindered settling to a much greater degree than the prior art methods I am able to effect more difficult separations than have been possible before. For the same reason a much greater size range can be treated with success in a single operation and better quality products are obtained.

On type of apparatus which I may utilize in the performance of my method is shown in Figure 3 of the drawing. In this figure it will be seen that a jig 1 is divided into a compartment 2 which contains a screen plate 3 for the support of the bed of material. This compartment 2 has an outlet 4 immediately above the screen plate through which the materials of greater specific gravity may be withdrawn from time to time or continuously if desired. A controlling valve 5 in a casing 6 may be used to regulate this withdrawal, though other forms of controlling means may be used. The compartment 2 is open at its top and is provided with an overflow lip 7. Any means for delivering the material to this compartment may be provided and such means is diagrammatically illustrated at 8. A drainage conduit 8a is also provided.

The jig 1 is also provided with inlet conduit 9 for the continuous delivery of liquid into the jig. A valve 10 may be used to control this conduit to vary the liquid input.

The jig 1 is also provided with a compartment 11 which, as shown, communicates at its lower end with the compartment 2. There is provided in this compartment 11 a plunger 12 which may be wholly or partially submerged in the liquid in this compartment. This plunger 12 may have a plunger rod 13 extending through the hub 14 of a spider carried by the casing and provided adjacent its upper end with a collar 15. A spring 16 surrounds the plunger rod 13 and is interposed between the hub 14 and the collar 15 on such plunger rod, this spring normally tending to elevate the plunger because of its expansive force.

The upper end of the plunger is preferably provided with a roller 17 which cooperates with an open cam 18 that may be rotated from any suitable source of power. As indicated above, this cam 18 may be designed by well-known methods from a previously plotted time-velocity curve by the usual integration process. The time-velocity curve selected may be the curve of Figure 2 or some other selected type of curve by which some or all of the essential features of my process may be performed.

In the operation of this apparatus, it will be evident that the downward movement of the plunger in response to actuation by the cam will force the liquid in compartment 11 downwardly, with the result that the liquid in the compartment 2 will be forced upwardly through the screen plate and through the bed of material superimposed thereon. If the cam has been properly designed from such a curve as shown in Figure 2, the velocity of the upwardly moving liquid will gradually increase until point a is reached. This velocity will be sufficient to open the bed to such an extent that a maximum condition of hindered settling consistent with the efficient separation will be obtained or approximated. Moreover, the cam will also be designed so that no further opening of the bed will be effected and that substantially the same velocity of liquid will be maintained until the point b of Figure 2 is reached, at which time, the velocity will begin to decrease and shortly become negative as the continued rotation of the cam permits the lifting action of the spring to raise the plunger and initiate the suction phase of the cycle. Obviously, the effectiveness of this lifting of the plunger by the spring will be offset to some extent by the continuous inflow of liquid into the jig through the pipe 9, with the result that there is a constant upward increment of liquid, considering the cycle as a whole.

While I have described my invention in connection with a plunger jig operated by a cam it is evident that other devices could be used to make the water velocities conform to those I have described. Thus in a pulsator type of jig the valve could be designed so as to produce the desired effect.

The advantages of my invention will be obvious to those skilled in the art. It may be stated, however, that actual tests of my method with a machine of the type diagrammatically illustrated in Figure 3 have demonstrated that this invention results in an increase in efficiency of the separating action of at least 20 per cent over and above that degree of efficiency obtainable with a jig wherein the time-velocity curve is substantially like that shown in Figure 1. This increase in efficiency appears to be due to the fact that the velocity of the liquid is increased to that extent necessary to open the bed and at the same time closely approximate the above described desired condition of hindered settling while the said selected velocity is substantially maintained for a period of time sufficient to insure at least as much water as that used in the pulsion phase of a jig wherein the time velocity curve is substantially identical with that shown in Figure 1.

Other advantages arise from this novel method and apparatus and these advantages will be clear from the preceding description and the appended claim.

Having thus described my invention, what I claim is:

The method of separating and sorting solids, which comprises subjecting a bed of solid particles to be separated to liquid currents in successive pulsion and suction phases, each of the pulsion phases being produced by forcing a current of liquid upwardly through the said bed and initially increasing the velocity of said current substantially continuously and progressively until a velocity is attained such that the said bed is opened up and a maximum condition of hindered settling consistent with effective separation is produced, and thereafter maintaining the velocity of said current substantially constant at the said attained velocity during the major portion of said pulsion phase to substantially maintain the said maximum hindered settling condition.

BERTRAM D. THOMAS.